Figure 1:
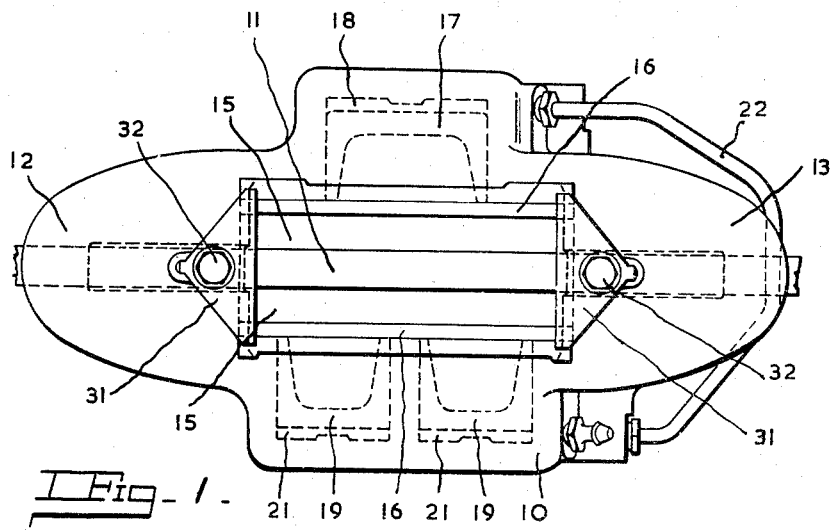

Sept. 6, 1960                J. W. DAVIS                 2,951,561
                         DISC BRAKES FOR VEHICLES
Filed Dec. 1, 1958                                    3 Sheets-Sheet 1

Inventor
John W. Davis
By Ralph B. Stewart
Attorney

Sept. 6, 1960  J. W. DAVIS  2,951,561
DISC BRAKES FOR VEHICLES
Filed Dec. 1, 1958  3 Sheets-Sheet 2

Inventor
John W. Davis
By Ralph B. Stewart
Attorney

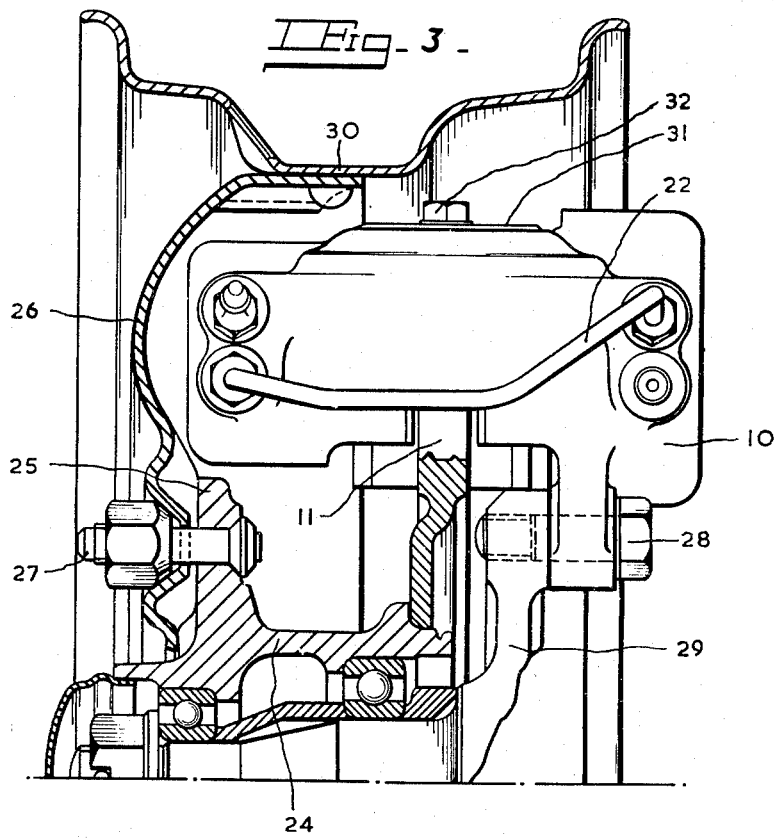
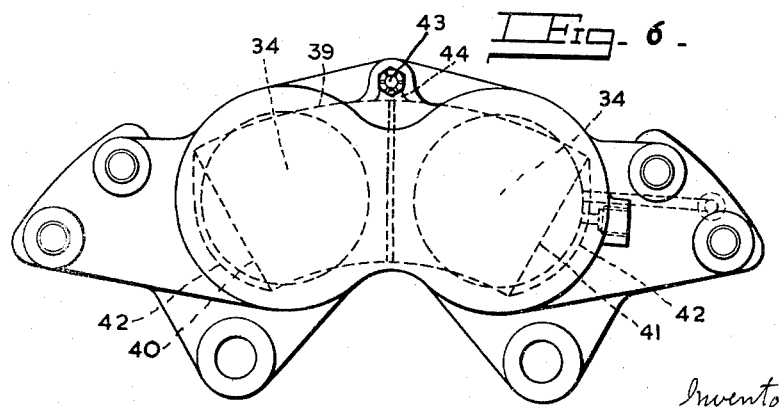

United States Patent Office 2,951,561
Patented Sept. 6, 1960

2,951,561

DISC BRAKES FOR VEHICLES

John Walter Davis, Rubery, Birmingham, England, assignor to Girling Limited, Tyseley, Birmingham, England, a British company Filed Dec. 1, 1958, Ser. No. 777,319

Claims priority, application Great Britain Dec. 6, 1957

4 Claims. (Cl. 188—73)

This invention relates to improvements in disc brakes for vehicles of the kind in which a fixed housing or caliper straddles a portion of a disc rotating with a wheel or other part of the vehicle transmission and friction pads are adapted to be urged into engagement with opposite faces of the disc by pistons in hydraulic cylinders located in or on the limbs of the caliper.

According to my invention, in a disc brake of that kind incorporating more than two hydraulic cylinders, there are different numbers of cylinders in or on the caliper on opposite sides of the brake disc but the sums of the cross-sectional areas of the cylinders on the two sides of the disc are such that the efforts applied to opposite sides of the disc are substantially balanced.

There may, for example, be two angularly spaced cylinders in or on one caliper limb and a single cylinder of larger diameter in the other limb, the area of the single cylinder being equal to the sum of the areas of the other two. The axes of all three cylinders are parallel to the axis of the brake disc and the axis of the single cylinder is mid-way circumferentially between the axes of the other two.

In other arrangements there may be three angularly spaced cylinders on the one side and one or two on the other; or four on the one side, and one, two, or three on the other; or five on the one side and one, two, three or four on the other.

Whatever the number or arrangement of the cylinders the diameters or cross-sectional areas of the cylinders will be such that the forces applied to opposite sides of the disc will be substantially equal.

It will be obvious that in any arrangement in which there is a smaller number of cylinders on one side than on the other, the cylinders of smaller number will be of greater diameter than the others so that the radial dimension of the central part of the caliper limb housing the larger number of cylinders can be substantially less than the corresponding dimension of the other limb, and conversely the circumferential length of the central part of the caliper limb housing the smaller number of cylinders can be less than the corresponding dimension of the limb housing the larger number of cylinders.

This feature is of considerable advantage where the brake disc is mounted on the inboard side of a road wheel, as the caliper can be mounted with the limb housing the greater number of cylinders on the wheel side of the disc between the wheel hub and rim, the smaller circumferential length of the other limb housing the smaller number of cylinders allowing the caliper to be accommodated in the relatively restricted space between the steering and suspension components of the vehicle.

Figure 2:
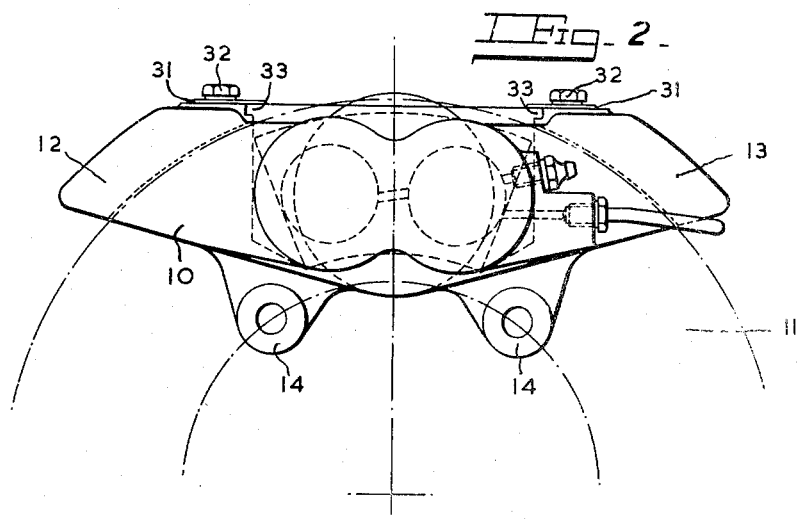
Figure 4:
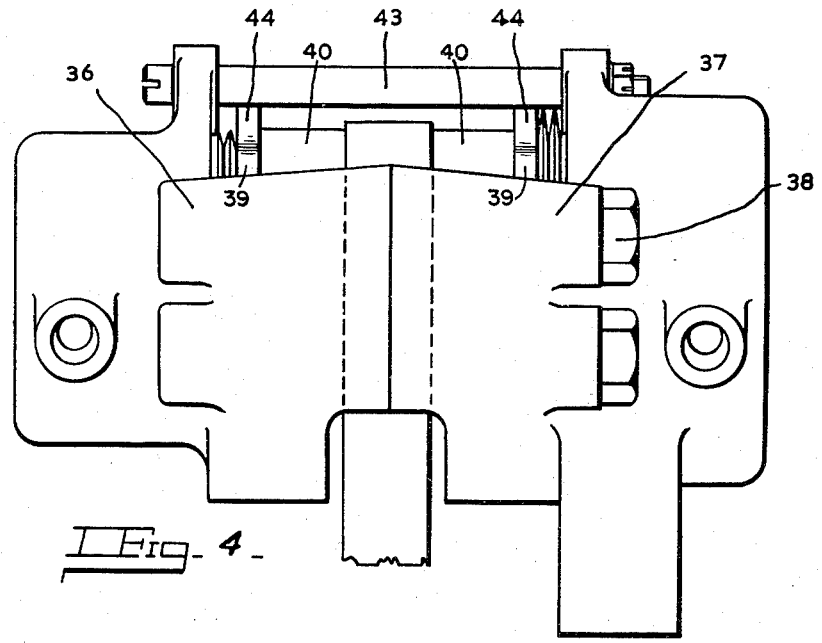
Figure 5:
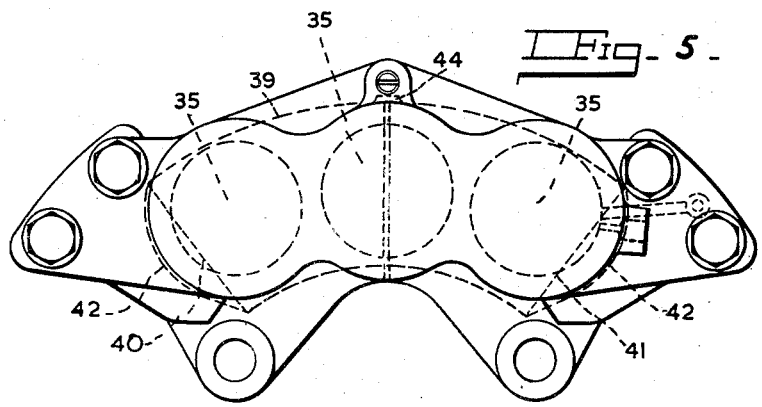

Two practical forms of disc brake for vehicles embodying my invention are illustrated by way of example in the accompanying drawings in which:

Figure 1 is a plan of a brake having two actuating cylinders on one side of the brake disc and one on the other side, Figure 2 is a side elevation of the brake shown in Figure 1, Figure 3 is a section of a part of a wheel and brake assembly incorporating a brake as shown in Figures 1 and 2, Figure 4 is an end elevation of a brake having three actuating cylinders on one side of the brake disc and two on the other, Figures 5 and 6 are side elevations from opposite sides of the brake shown in Figure 4.

In the brake shown in Figures 1 and 2, the housing or caliper 10 is a casting or forging incorporating two parallel limbs which are adapted to lie on opposite sides of the peripheral portion of a brake disc 11 over which the caliper fits, the limbs being rigidly connected at their ends by portions 12 and 13 of the casting or forging which lie outside the periphery of the disc, the width of the end portions 12, 13 being less than that of the central portions in which the hydraulic cylinders are located. One limb of the caliper is formed with spaced inwardly extending lugs 14 to receive bolts by which the caliper is secured to a fixed part of the vehicle adjacent to the disc.

Friction pads 15 of segmental outline adapted to engage opposite faces of the disc are bonded to steel backing plates 16 which are guided in the limbs of the caliper for movement towards and away from the disc. The friction pad on one side of the disc is applied by a piston 17 working in a single hydraulic cylinder 18 of which the axis is at right angles to the disc and at the middle of the circumferential length of the caliper.

The other friction pad is applied by pistons 19 working in two parallel spaced cylinders 21, the axes of these cylinders being spaced at equal distances from the center of the circumferential length of the caliper.

The closed outer ends of the two cylinders 21 are interconnected and are connected to the outer end of the cylinder 18 by an external pipe 22, and a pipe (not shown) conveys fluid under pressure from a master cylinder or the like to the cylinders to apply the brake.

The diameters of the two cylinders 21 are equal but are less than the diameter of the cylinder 18, the cross-sectional area of the cylinder 18 being equal to the sum of the cross-sectional areas of the cylinders 21, so that when the brake is applied the efforts applied to opposite sides of the disc are balanced.

Figures 1 and 2 show that the radial dimension of the limb of the caliper housing the two cylinders 21 is less than that of the limb housing the cylinder 18, and that the circumferential length of the central part of the limb housing the cylinder 18 is less than the corresponding dimensions of the limb housing the two cylinders 21.

The practical advantages of this feature are shown in Figure 3, which is a section of a part of a wheel and brake assembly embodying a caliper as shown in Figures 1 and 2.

The brake disc 11 is mounted on the inboard end of a rotatable hub 24 having at its outer end a radially extending flange 25 to which the wheel 26 is secured by bolts 27. The caliper is mounted by means of bolts 28 on a flange 29 on a fixed part of the axle on the inboard side of the disc and is mounted with the limb which houses the two cylinders 21, and which is of a smaller radial dimension than the other, located between the wheel rim 30 and the flange 25 on the hub. The smaller circumferential length of the other limb which houses the cylinders 18 provides clearance for the suspension and for the steering members in the case of brakes on steered wheels.

The caliper shown in Figures 1, 2 and 3 is of the kind described and claimed in the specification of my British Patent No. 742,336, the radially outermost face of the caliper having an opening of sufficient circumferential length to allow the pads and backing plates to be removed through the opening when the pads are worn and fresh pads and backing plates to be inserted.

The pads and backing plates are normally retained in position in the caliper by readily detachable keeper plates 31 secured to the caliper at each end of the opening by bolts 32 and engaging with lugs 33 on the outer ends of the backing plates.

In the caliper illustrated in Figures 4, 5 and 6 there are two hydraulic cylinders 34, in one limb of the caliper and three hydraulic cylinders 35 in the other limb, the sum of the cross-sectional areas of the cylinders 34 being equal to the sum of those of the cylinders 35. The caliper is formed in two halves, 36 and 37, the division being in the central plane of the disc, and the two halves are secured together by bolts 38 lying outside the periphery of the brake disc.

Each backing plate 39 carries two segmental pads 40 and 41 which are bonded to it, and the ends of the plates are radiused as shown at 42 and engage with complementary guiding surfaces in the caliper limbs which take the torque when the brake is applied.

The caliper is open at its radially outermost side for the insertion and removal of the friction pads and backing plates which are normally retained in position by a bolt 43 extending transversely across the opening and co-operating with radially projecting lugs 44 on the backing plates at the middle of their length.

In both of the brakes illustrated the hydraulic cylinders are formed within the limbs of the calipers but it will be appreciated that the cylinders may be formed separately, in which case they will be bolted or otherwise secured to the limbs of the calipers over openings therein.

Also, in the brakes illustrated, the caliper fits over the outer periphery of a disc mounted on a wheel hub, but the invention is equally applicable to a brake in which the caliper fits over the inner periphery of a ring extending radially inwards from a wheel hub or the like.

Further, in the brakes illustrated, the axes of the cylinders are parallel to each other and to the axis of the disc but they need not be parallel and may be inclined with respect to the axis of the disc.

I claim:

1. A disc brake for vehicles comprising a disc rotating with a part of the vehicle transmission, a fixed caliper having two limbs straddling a portion of said disc, friction pads in said caliper on opposite sides of the disc, at least one hydraulic cylinder in the caliper on one side of the disc with a piston working in the cylinder, for urging a friction pad into braking engagement with the disc, and at least two such hydraulic cylinders and pistons in the caliper on the other side of the disc, the number of cylinders in the caliper on one side of the disc being different from the number on the other side and the sum of the cross-sectional areas of the cylinders in the caliper on opposite sides of the disc being such that the efforts applied to opposite sides of the disc are substantially balanced.

2. A disc brake as in claim 1 wherein there are two angularly spaced hydraulic cylinders in one limb of the caliper and a single hydraulic cylinder in the other limb of such a diameter that the cross-sectional area of the single cylinder is substantially equal to the sum of the cross-sectional areas of the other two.

3. A disc brake as in claim 1 wherein the caliper comprises two parallel limbs which are rigidly connected together at their ends and the central parts of which house the hydraulic cylinders, and the central part of the limb which houses the greater number of cylinders is of less radial width and of greater circumferential length than the central part of the other limb.

4. A disc brake and wheel assembly for a motor vehicle comprising a wheel having a hub and a rim, a brake disc rotating with and located on the inboard side of the wheel, a fixed caliper having two limbs straddling a portion of said disc, friction pads in the caliper on opposite sides of the disc, at least one hydraulic cylinder in a caliper limb on one side of the disc and a piston working in the cylinder for urging a friction pad into braking engagement with the disc, and at least two such cylinders and pistons in the other limb of the caliper for urging the other friction pad into engagement with the other side of the disc, the number of cylinders in one limb of the caliper being greater than the number in the other limb and the sum of the cross sectional areas of the cylinders in the caliper on opposite sides of the disc being such that the efforts applied to opposite sides of the disc are substantially balanced, and the caliper being mounted with the limb housing the greater number of cylinders on the wheel side of the disc between the hub and rim of the wheel.

References Cited in the file of this patent

FOREIGN PATENTS 742,338     Great Britain _____ Dec. 21, 1955